United States Patent [19]

Quigley

[11] Patent Number: 5,324,248
[45] Date of Patent: Jun. 28, 1994

[54] COMPOSITE MACHINE ROLL AND METHOD OF MANUFACTURE

[75] Inventor: Peter A. Quigley, Cataumet, Mass.

[73] Assignee: Composite Development Corporation, West Wareham, Mass.

[21] Appl. No.: 970,631

[22] Filed: Nov. 3, 1992

[51] Int. Cl.⁵ ............................................. B23P 15/00
[52] U.S. Cl. .................................. 492/50; 29/895.21; 29/895.3; 29/895.32; 492/52
[58] Field of Search ............... 29/895.32, 895.3, 895.21, 29/895.2, 895.22; 492/50, 52

[56] References Cited

U.S. PATENT DOCUMENTS

| | | | |
|---|---|---|---|
| 3,593,398 | 7/1971 | Hess et al. | 492/50 |
| 4,242,783 | 1/1981 | Watanabe et al. | 492/52 |
| 4,466,164 | 8/1984 | Tadokoro et al. | 492/52 |
| 4,841,613 | 6/1989 | Beery et al. | 492/50 |
| 5,048,441 | 9/1991 | Quigley | 114/90 |
| 5,167,068 | 12/1992 | Leino et al. | 29/895.32 |

FOREIGN PATENT DOCUMENTS

| | | | |
|---|---|---|---|
| 0666332 | 7/1988 | Switzerland | 492/50 |
| 2057092 | 3/1981 | United Kingdom | 492/52 |

OTHER PUBLICATIONS

Bruno, "Innovative Composite Plate Cylinders Outdate Steel," May 1992.
"Spectra High Performance Fibers For Reinforced Composites," Product Guide for Allied-Signal Inc.
"Kevlar: The Uncommon Material for Uncommon Solutions," Product Guide for E. I. Du Pont de Nemours & Co., Inc.
"RCS Nickel Sleeves for Flexographic Printing," Product Guide for Stork Cellramic, Inc.

Primary Examiner—Irene Cuda
Attorney, Agent, or Firm—Lahive & Cockfield

[57] ABSTRACT

A machine roll has a roller sleeve structured with an outer layer that is hard, wear resistant and machinable, and with an interior body layer of a fiber-reinforced polymer. The body layer is relatively light in weight, is structured to damp vibration and provides the structural rigidity of the roll. The sleeve can also have one or more interface layers, preferably of a composite, disposed in one instance between the outer and body layers and disposed in another instance within the body layer.

20 Claims, 1 Drawing Sheet

COMPOSITE MACHINE ROLL AND METHOD OF MANUFACTURE

BACKGROUND

This invention relates to the structure and the manufacture of a roller sleeve and of a machine roll employing the sleeve. The invention attains rollers that have relatively low weight combined with other advantages, including high vibration damping, stable and precise dimensions, and a durable hard roller surface.

Machine rolls are used in various machines that manufacture, process or otherwise handle webs of material such as paper and fabric. A machine roll generally has three components, namely a cylindrical roller sleeve and two journals that mount the sleeve for rotation. The journals typically include hardened steel sleeves to reduce wear.

One exacting application of machine rolls is in the transfer of ink in a printing press. By way of example, a flexographic press that prints six or eight colors has printing plates located around a single central drum. Three rolls, termed an anilox roll, a plate cylinder roll, and a central drum roll, function together to print a color image. The anilox roll transfers ink to a printing plate that is attached to the plate cylinder roll. A conventional anilox roll has a hard ceramic surface coating that is laser-etched with up to 160,000 small pits per square inch, to control with precision the amount ink transferred to the printing plate. The plate cylinder roll is wrapped with the flexible printing plate. The printing plate picks up ink from the anilox roll and transfer it to the web that is being printed, e.g. a paper, film or foil. The central drum roll supports that web during ink transfer operations.

Conventional anilox rolls and plate cylinder rolls are typically of steel and weigh as much as 250 pounds each. The heavy rolls require mechanized lifting devices, can be time-consuming to change and are a safety hazard to handle.

Further, the anilox roll and the plate cylinder roll are subject to vibration. The vibration, which is due at least in part to the lower critical speeds of steel rolls, causes vibration at lower rpm. This vibration, and other resonances and bounce of the rolls, detract from the printing quality and from the line speed.

A further factor regarding anilox and plate cylinder rolls, and other kinds of machine rolls, is the requirement for exacting dimensional tolerances. For example, the outer diameter of the journals of a print roll, also termed a print cylinder, is to be precisely dimensioned with respect to the outer diameter of the cylinder roller surface; tolerances on concentricity, roundness and total indicator runout print (TIR) typically are on the order of ±0.0003 inch.

Accordingly, an object of this invention is to provide a machine roll that matches or exceeds the performance of prior metal rolls and has significantly less weight.

Another object of this invention is to provide a machine roll that has relatively low weight and that damps vibration, such as mechanically induced vibration as caused by rotation of the roller and by the printing process.

A further object of this invention is to provide a roller sleeve for assembly into a machine roll having the foregoing features.

It also an object of this invention to provide a method for manufacture of such roller sleeves and machine rolls.

Other objects of the invention will in part be obvious and in part appear hereinafter.

SUMMARY OF THE INVENTION

A roller sleeve according the invention solves the foregoing problems with a multilayer structure that has at least an outer layer and an interior body layer of a composite material. The composite of the body layer employs fibers characterized by high-damping, to curtail vibration, resonance and bounce. The outer layer of the sleeve is of machinable hard material that forms an outer roller surface that is resistant to scratching and abrasion.

The interior layer, referred to herein, for convenience and not in a limiting sense, as a damped body layer, can provide a major portion of or the entire structural features of the roller sleeve, other than a hard outer roll surface. This includes providing the requisite stiffness, rigidity, light weight and mechanical damping.

The damped body layer of a roller sleeve according to the invention generally constitutes fifty to ninety-five percent of the total wall thickness of the sleeve. The sleeve preferably is fabricated with one or more plies of fibers in an epoxy or other resin matrix. The fibers preferably are continuous in each ply and can be woven, with the warp fibers and the woof fibers oriented axially and circumferentially respectively, or oriented with bias orientations. However, a structurally balanced orientation of the fibers is deemed preferable. Alternatively, the fibers can be applied, as by winding, as unidirectional filaments. A further alternative is to provide the fibers in textile forms other than woven, such as in the form of knits or braids.

It is deemed preferable for at least many industrial applications that the mechanical properties of the damped body layer of the sleeve include a tensile modulus, in the axial direction, in excess of $1.5 \times 10^6$ psi, and a maximum flexual stress in excess of 20,000 psi. A preferred density for the composite material in the damped body layer is between one gram per cubic centimeter and 2.5 grams per cubic centimeter. The vibration damping property of the layer is preferably such that the loss factor of the layer is greater than in prior roller sleeves fabricated of stainless steel, ductless cast iron, graphite and epoxy composite, or fiberglass and epoxy composite. One measure of the preferred damping characteristics of the damped body layer is that the amplitude of the vibrations caused by a mechanical excitation decreases more rapidly than in a material such as steel, aluminum, carbon fiber reinforced epoxy, or glass fiber reinforced epoxy. For example, in a graph of the amplitude of deflection of vibration versus time, the decay or damping of the vibration is dependent on the natural logarithm of the ratio of two successive amplitudes; i.e. is dependent on $(\ln(A_i/A_{i+1}))$ where $(A_i)$ and $(A_{i+1})$ are the two successive amplitudes. For comparison purposes, the damped body layer of the invention has at least approximately twenty times greater damping than stainless steel, and at least approximately five times greater damping than a composite of carbon fiber and epoxy.

The number of-fiber plies in the composite structure of the damped body layer is determined with conventional computations to attain the desired stiffness, rigidity and other mechanical properties for the roller sleeve.

Preferred composite materials for the damped body layer are an epoxy resin and synthetic polymer fibers having high mechanical damping. One such fiber is marketed by E.I. DuPont Company under the brand Kevlar, and another is marketed by Allied Chemical Company under the brand Spectra.

The hard outer layer of the roller sleeve of the invention can be provided with multiple structures, depending in part on the application of the roll. One example is a metal foil laminated onto the interior structure. According to another practice of the invention, a preformed metal sleeve is assembled onto the interior structure. One preferred method of this assembly expands the sleeve, typically of stainless steel or of nickel, with air sufficient to allow the sleeve to be slid over the inner layer or layers of the roller sleeve.

Other embodiments of the outer scratch and abrasion resistant layer of the roller sleeve employ thermally sprayed metal, metal plated chrome and a metal having a ceramic overcoating. Examples of the latter include plasma-sprayed ceramic material such as chromium oxide, tungsten carbide, and the like.

Still another embodiment provides the outer hard layer with a fiber and resin composite that incorporates a hardener, such as silicion carbide, in the composite material.

A roller sleeve according to the invention preferably has one or more additional layers. One practice is to provide the damped body layer in the form of two or more layer elements, each of which is a composite material employing a highly damping fiber as described above.

Another practice is to provide one or more so called interface layers. One interface layer according to the invention is an innermost layer of the roller sleeve and fabricated of a resin and fiber composite. It is structured to provide secure mounting attachment to the journals of the roller.

Another embodiment of an interface layer in a roller sleeve according to the invention is a fiber and resin composite layer located between the hard outer layer and the damped body layer. The resin and fiber constituents of this intermediate layer are preferably structured to have a coefficient of thermal expansion and contraction that is between, and preferably midway between the thermal expansion coefficients of the two layers between which it is sandwiched. The interface layer thus preferably has thermal expansion properties that match, in the sense of bridging——or providing a transition——between those properties of the adjoining layers.

The composite material in the interface layers of the roller sleeve, such as in the innermost and the intermediate layers discussed above, can employ fibers of carbon or glass and an epoxy resin. Another factor in structuring an interface layer according to the invention is for machinability. For example, the damped body layer typically is of a composite that is not readily machined. Accordingly, providing an interface layer of machinable composite on the interior of the damped body layer, or on the exterior, or at both locations, enables the final dimensions and surfaces of this laminate of the damped body layer and the one or more interface layers to be readily machined as desired.

It is also a feature of a roller sleeve according to the invention that it be substantially balanced, in terms of minimizing the transfer of a stress or strain that occurs in one spatial dimension in the sleeve to develop a stress or strain in a second dimension. It is thus a feature of the invention to balance the sleeve structure and thereby to reduce coupling, which is the tendency of the sleeve structure to transfer an action from one dimension to another dimension.

One practice of this feature of the invention balances the roller sleeve structure about an imaginary cylindrical surface passing through the middle of the thickness of the sleeve. Such balance can be obtained by providing identical or otherwise equivalent structures on either side of the imaginary mid-thickness cylindrical surface. For example, a roller sleeve having a damped body layer between intermediate and innermost interface layers of identical carbon-expoxy composite, and each of the same thickness, is deemed balance. On the other hand, a sleeve with only an innermost interface layer and not an intermediate one, or a sleeve with only an intermediate interface layer and not an innermost one, is deemed not balanced. Correspondingly, a sleeve having both innermost and intermediate interface layers but of different fibers, or of different resins, or of different thicknesses, tends not to be balanced, unless the two interface layers are otherwise structured to function symmetrically and to diminish coupling.

In many applications, balance need not be perfect or ideal. For example, this feature of the invention is concerned primarily with obtaining balance among layers of the sleeve other than the outer layer. This is particularly acceptable where the outer layer has small thickness relative to the rest of the sleeve. Accordingly, the interface layers of a sleeve according to the invention can be structured, in addition to other objectives, to obtain a balanced structure with the other layers.

The method of fabricating a roller sleeve in accordance with the invention includes forming the interior, tubular damped body layer of a composite material formed with fibers characterized by high vibration damping. The outer layer, which is of hard yet machinable material that forms a scratch and abrasion resistant outer roll surface for the sleeve, is applied over the damped body layer.

In one practice of the method, the damped body layer is fabricated with multiple plies of the damping fiber, in woven, braided, or knit form, or as unidirectional fibers, with epoxy resin. The tubular layer can be fabricated on a mandrel, for example, on a known three-point rolling machine. Where the outer layer is of a hardened or other composite material, it is applied over the damped body layer, typically with multiple plies, after which the composite plies are covered with a compacting tape and cured. After the compacting layer and the mandrel are removed, the cured sleeve structure is assembled with roller journals, and the sleeve outer surface and the journals are machined to attain the requisite concentricity and other dimensions.

In an alternative manufacture, where the hard outer layer is applied as a preformed metal sleeve or tube, the plies constituting the one or more interior layers of the roller sleeve are laid up on a mandrel. After a compacting layer is applied, the assemblage is cured. Thereafter, the outer metal layer is applied, metal journals are assembled with the roller sleeve, and the assembled roll is subjected to final machining.

A roller sleeve according to the invention, and a machine roll according to the invention, are characterized by relatively light weight, and high resistance to vibration. Further features of the sleeve and of the resultant roll are precision dimensions, dimensional stability including with respect to temperature changes, and a hard outer surface resistant to scratching and abrasion.

The invention accordingly comprises the several steps and the relation of one or more of such steps with respect to each of the others, and the roller sleeve and machine roll possessing the features, structure, properties and relation of elements exemplified in the following detailed disclosure, and the scope of the invention is indicated in the claims.

BRIEF DESCRIPTION OF THE DRAWING

For a fuller understanding of the nature and objects of the invention, reference is to be made to the following detailed description and the accompanying drawing, in which.

DESCRIPTION OF ILLUSTRATED EMBODIMENTS

Figure 1:
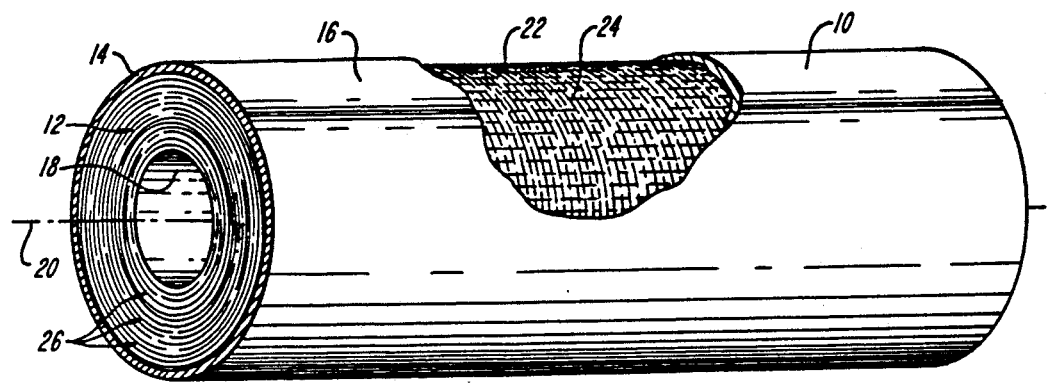
FIG. 1 is a perspective view, partly cut away, of a roller sleeve embodying features of the invention.

FIG. 1 shows a roller sleeve 10 according to the invention having a composite interior layer 12, of fiber reinforced resin, and an outer layer 14 forming a hard, outer roller surface 16. The roller sleeve 10 is a hollow tubular structure with a tubular inner surface 18, and the outer roller surface 16 is cylindrical. Each layer 12 and 14 has a hollow tubular shape and, as illustrated, is preferably cylindrical and coaxial with a roll axis 20 of the sleeve.

The interior layer 12, also designated a body layer and a damped body layer, is structured of resin, also termed polymer, and of fibers to provide the sleeve with the requisite mechanical properties of rigidity, stiffness and the like equivalent to or exceeding that of known roller sleeves of conventional construction and as determined to meet the particular industrial application. Further, it is relatively light in weight. Another feature of the body layer 12 is that the fibers have high mechanical damping, to damp vibrations in the sleeve. The vibration damping is effective for axial, circumferential, radial and torsional vibrations.

The sleeve body layer 12 is structured with multiple plies of fiber 22 embedied in resin 24. The number of plies is determined using known calculations to obtain the desired strength characteristics of the roller sleeve. The fibers 22 in each ply are generally continuous in length, e.g. along the sleeve length or about the sleeve circumference.

As further shown in FIG. 1, the illustrated body layer 12 is fabricated with fibers 22 applied in preformed woven sheets 26. The illustrated sheets 26 are oriented with the warp fibers and the woof fibers extending axially and circumferentially, respectively, i.e., with zero and ninety degree orientations, respectively, relative to the sleeve axis 20. Another preferred embodiment employs woven sheets with the fibers oriented at forty-five degrees relative to the sleeve axis. Both embodiments provide substantially symmetrical fiber orientations and are accordingly deemed preferable.

In alternative constructions of a roller sleeve 10 according to the invention, the fibers 22 are applied in textile forms other than woven sheets; for example the fibers in each ply are knitted or are braided. A further embodiment is to employ discrete unidirectional fibers, for example, similar to those disclosed in U.S. Pat. No. 5,048,441.

Whichever structure of fibers is used, the body layer 12 in a roller sleeve 10 for use, by way of example, in a flexographic printing press as discussed above preferably has the following properties: tensile modulus in the direction of axis 20 in excess of $1.5 \times 10^6$ psi; maximum flexural stress in excess of 20,000 psi; density between one gram per cubic centimeter and 2.5 grams per cubic centimeter; and damping loss factor in the order of ten to the minus two or greater. The loss factor is defined as the ratio of two successive peak amplitudes in a decaying vibration.

Examples of the vibration damping fiber 22 in each ply of the body layer 12 are an aramid fiber as marketed by E.I. DuPont Company under the designation Kevlar, and an oriented polyethylene fiber as marketed by Allied Chemical Company under the designation Spectra. Each of these fibers has a damping factor, to decay vibrations, greater than that of known metallic materials and greater than that of other synthetic fibers, including those of graphite and of fiberglass.

With further reference to FIG. 1, the sleeve outer layer 14 is hard to resist wear as by abrasion and scratching, and is machinable. In one preferred embodiment, it is of metal. The metal can be applied as a preformed sleeve of steel or nickel that is expanded by air and slid onto the interior structure of the roller sleeve. This assembly technique using air is presently employed to intall thin nickel tubes over print cylinders. One alternative of the outer layer 14 employs a laminated metal foil. For this embodiment, a thin epoxy resin layer is applied to a metal foil and the epoxy-foil laminate is wrapped about the interior structure of the sleeve and cured concurrent with the curing of the fiber reinforced composite in the sleeve body layer 12. The resin provides a bond between the metal and the interior structure of the sleeve. One specific practice employs a stainless steel foil that is generally 0.005 to 0.010 inch thick, laminated to a layer of resin epoxy that is between 0.001 to 0.003 inch thick.

A third embodiment for providing the roller sleeve 10 with a metal outer layer 14 employs a thermally sprayed metal.

Yet another embodiment employs a sleeve outer layer 14 having a metal substrate with a ceramic overcoat. This technique is known in industry for coating components subjected to high abrasive wear.

In another embodiment of the roller sleeve 10, the outer layer 14 is of reinforced composite material that is both machinable and yet sufficiently hard to resist scratching and abrasion. One preferred composite material for this purpose employs glass reinforced epoxy or carbon reinforced epoxy, and has a hardener such as silicone carbide powder added to the epoxy resin. Preliminary evaluation indicates that a composite of carbon fiber and silicone carbide with epoxy is preferred to one having glass fiber. The outer layer 14 of composite material is typically cured with the curing of the composite body layer 12. The silicone carbide hardener is illustrative of hard, typically ceramic, materials added to the matrix, in powdered or like relatively fine grain particulate form, of a continuous filament composite material to impart improved resistance to wear, such as scratching and to abrasion.

Figure 2:
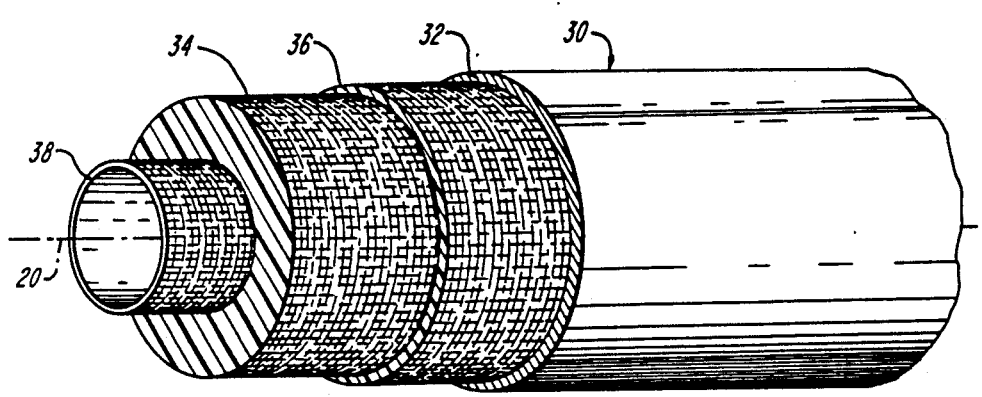
FIG. 2 is a perspective view, partly broken away, of a second roller sleeve embodying features of the invention.

FIG. 2 shows another roller sleeve 30 according to the invention having an outer roller layer 32 and a damped body layer 34. In addition, the sleeve 30 has an intermediate interface layer 36 disposed between the outer layer 32 and the body layer 34, and has an innermost interface layer 38 within the body layer 34. The outer roller layer 32 and the damped body layer 34 are each structured as discussed above, including with reference to the layers 12 and 14 respectively of the sleeve 10 of FIG. 1, to provide the roller outer surface and the mechanical strength and integrity required for the particular industrial application of the roller sleeve 30.

The two interface layers 36 and 38 are typically each of fiber reinforced polymer. It is preferable to obtain a balanced structure of the sleeve 30, in that the two interface layers employ the same composite materials and structures. The intermediate interface layer 36 is otherwise designed to provide a transition between, and thereby match the different thermal expansion properties of the adjoining body layer 34 and the outer layer 32. It is further structured to be machinable, particularly where it is desired that the outer layer 32 be applied to a structure of known outer diameter. The innermost interface layer 38 is otherwise structured to facilitate the mounting of journal bearings.

A roller sleeve according to the invention can be structured as shown in FIG. 2 but having only one interface layer, i.e. either the intermediate layer 36 or the innermost layer 38. One such a roller sleeve having a single interface layer typically has an intermediate layer, like the illustrated layer 36, structured to match the thermal properties of the adjoining outer and body layers, and to provide machinability. Where the single interface layer is an innermost layer like the illustrated layer 38, it is typically structured for mounting the sleeve on journals.

EXAMPLE I

One specific embodiment of a roller sleeve 30 as shown in FIG. 2 has an innermost interface layer 38 structured with two interior plies of carbon fiber plain weave fabric in epoxy resin with each ply being approximately 0.025 inch thick. One such carbon fiber plain weave fabric with epoxy is marketed by Advanced Composites Group, Inc. with the product designation CFS 007-MT6D.

The body layer 34 has thirty plies, each of style 500 kevlar number 49 plain weave fabric embedded in epoxy resin, with each ply being approximately 0.01 inch thick. This fabric with epoxy is available from the same company identified above under the designation K49-500-MTD6.

The intermediate interface layer 36 is initially structured with seven plies of carbon fiber plain weave fabric in epoxy resin using the Advanced Composites Group, Inc. product designated CFS003-MTD6, with each ply having a thickness of about 0.10 inch.

These three layers 34, 36 and 38 of the FIG. 2 roller sleeve 30 are fabricated as follows on a mandrel using a three point rolling machine. The plies of the three layers are applied in succession, commencing with the plies of the innermost interface layer 38 followed by the plies of the body layer 34 and followed in turn by the plies of the intermediate interface layer 36.

Where the outer layer 32 of the sleeve 30 does not require curing concurrent with the other layer, a compacting layer of release tape is applied over the three layers of plies, using for example one-half inch wide and 0.0015 inch thick unoriented polypropelene, followed by an overwrap of one-half inch wide, 0.0025 inch thick cellophane tape. The first layer of compacting tape has good release properties, and the second, cellophane layer has desirable shrinkage properties.

The assemblage of the multiple fiber fabric and resin plies on the mandrel, and enclosed by the compacting tapes, is cured at 175° F. for one-half hour and further at 250° F. for one and one-half hours. After cooling, removal of the mandrel and removal of the release tapes, the outer diameter of the intermediate interface ply 36 is machined to the desired dimension, prior to applying the outer layer 32.

However, where the outer layer 32 also employs a composite material, such as the composite described above having a hard powder filler, one or more plies of the outer layer composite are applied over the interface layer 36 prior to applying the compacting tapes and prior to curing. In this practice of the invention, the intermediate interface layer 36 preferably has essentially the same total thickness as the innermost interface layer 38——for purposes of balance——inasmuch as the intermediate interface layer 36 is not machined prior to applying the hard outer layer.

An illustrative outer layer 32 employing a hardened composites employs seven plies of carbon plain weave fiber fabric in epoxy resin, to which twenty percent by weight of 400 grit silicone carbide particles are added and in which each ply has a thickness of about 0.010 inch. These plies of the outer layer are applied over the body and interface layers and are cured together with them.

EXAMPLE II

Another specific embodiment of a roller sleeve as shown in FIG. 2 has the three layers 34, 36 and 38 fabricated as follows:

- intermost interface layer 38: five interior plies of E-glass fiber plain weave in epoxy resin, each ply being approximately 0.010 inch thick, for example, as supplied by Advanced Composites Group, Inc. under the product designation GPS001-MT6D
- Body layer 34: ten plies of style S795 Kevlar 149 plain weave in epoxy resin, with each ply being approximately 0.03 inch thick and supplied by Advanced Composite Group Inc. under the designation K149-795-MT6D; and
- Intermediate interface ply 36: seven exterior plies of E-glass fiber plain weave in epoxy resin each having a thickness of about 0.10 inch as marketed by Advanced Composite Groups, Inc. under the designation GPS001-MT6D.

These three layers are preferably fabricated in succession on a mandrel using a three point roller mill, and cured after the application of a compacting layer of release tape and followed by a second overwrap of cellophane tape. The assemblage is cured under the same temperatures and times as described in the example above.

The cured plies of layers 34, 36 and 38 are prepared for application of the outer layer 32 by machining the intermediate interface layer 36. In one practice, the diameter of the layer is machined to be within 0.005 to 0.010 inch less than the desired final outer diameter of the finished roller sleeve. Subsequently, a sleeve of stainless steel or nickel with a wall thickness between 0.005 and 0.015 inch and with an unexpanded inner diameter 0.001 to 0.005 inch less than that of the machined and assembled layers 34, 36 and 38 is expanded with air and slid over the three composite layers. The final machining of the sleeve is typically performed with an OD grinding machine to achieve the desired final wall thickness and the requisite concentricity, runout, outer diameter and surface finish requirements.

With further reference to the manufacturing of the sleeve layers 34, 36 and 38 of FIG. 2, the fiber fabric for each ply preferably is a preimpregnated woven material using an epoxy resin which is cured to an intermediate B-stage. One preferred epoxy resin is a bisphenol-A type epoxy resin with an aromatic polyamine based on a 4, 4, diaminodiphenlymethane. The preimpregnated B-stage cured sheets are cut to length and to width prior to rolling onto the mandrel, in a manner much like a cigarette is rolled, as known in the art.

Figure 3:
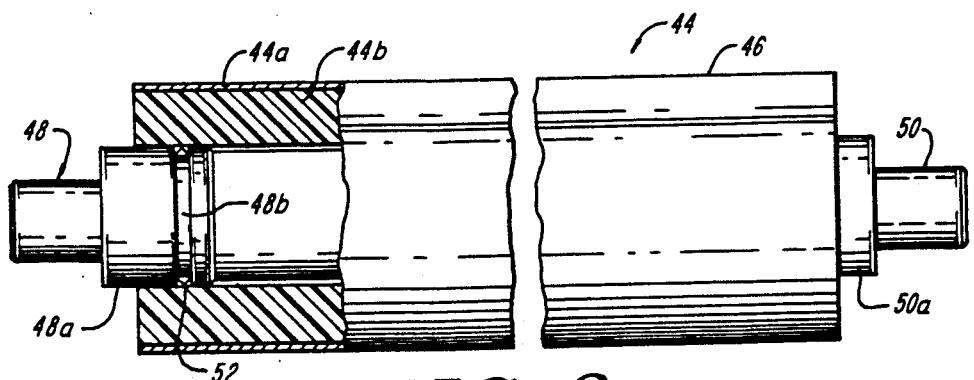
FIG. 3 is a perspective view of a machine roll according to the invention.

A preferred practice of the invention, wherein the outer layer of a roller sleeve, such as the layer 12 of the FIG. 1 sleeve 10 or the layer 32 of the FIG. 2 sleeve 30, does not require curing with the body layer and any interface layers, assembles the body and interface layers of the sleeve with metal journals prior to application of the outer layer. More particularly, FIG. 3 shows a machine roll 44 embodying further features of the invention and in which a sleeve 46 is assembled with a metal journal 48, 50 at each axial end. The roll 44 has an outer layer 44a bonded to a core 44b that has a damped body layer and that can additionally have one or more interface layers, all as discussed above.

The journals 48 and 50 are structured using techniques known for conventional steel rolls. Each is rough machined prior to assembly within the sleeve 46. The sleeve inner diameter is machined or otherwise prepared for telescopic assembly with the journal base 48a, 50a.

One practice recesses each journal base 48a, 50a with one or more circumferential grooves 48b, 50b and secures the sleeve to the journal base with an adhesive 52 that seats in the journal grooves and that bonds to the sleeve inner surface. An illustrative adhesive for this purpose is the epoxy adhesive as marketed by Crest Products Corporation, Fountain Valley, Calif. under the designation resin number 7339 and catalyst number 7135.

It is also within the scope of the invention to form each journal with a base having a non-cylindrical outer surface, such as an hexagonal or octogonal outer surface, and to form the sleeve inner diameter, at the end thereof which telescopically receives the journal base, with a matching non-cylindrical surface. This construction using hexagonal, octogonal or other non-circular journal base and sleeve surfaces ensures that the sleeve and journals rotate as a single unitary assemblage, and subjects the anchoring adhesive or other securing mechanism to minimal torsional strain.

After journals are assembled with a roller sleeve as shown in FIG. 3, the assemblage is advantageously subjected to final fabrication and machining. For example, the sleeve outer diameter is machined to the desired dimension and the journals are machined to final dimension, to ensure concentricity, runout and surface finish requirements.

Where the sleeve outer layer is a preformed metal sleeve or other structure not requiring curing with the body and any interface layers, the journals 48 and 50 are preferably assembled with the body any any interface layers as illustrated in FIG. 3 and the assemblage is machined to receive the outer layer 32, for example to receive a preformed stainless steel or nickel sleeve that is assembled with air expansion as discussed above. After applying the outer layer to the other elements of the machine roll 44, final machining of the sleeve is performed concurrently with final machining of the journals, typically used with an OD grinding machine.

It will thus be seen that the invention officially attains the objects set forth above, among those made apparent from the preceding description. Since certain changes may be made in the above methods and in the constructions set forth without departing from the scope of the invention, it is intended that all matter contained in the above description or shown in the accompanying drawing be interpreted as illustrative and not in a limiting sense.

It is also to be understood that the following claims are intended to cover all generic and specific features of the invention herein described, and all statements of the scope of the invention which as a matter of language, might be said to fall therebetween.

Having described the invention, what is claimed as new and secured Letters Patent:

1. In a machine roll having a pair of axially spaced journals mounting a roller sleeve, the improvement in which
   A. said roller sleeve is a tubular laminate of at least a first tubular layer and a second tubular layer disposed thereover, said second tubular layer forming the machine roll outer surface and having a hard, scratch resistant and dimensionally stable outer surface, and
   B. said first tubular layer has high mechanical damping and high strength, and consists essentially of a composite of polymer resin and reinforcing fibers characterized by damping of vibration greater than by carbon fiber and greater than by fiberglass fiber, whereby said roller sleeve is characterized by significant resistance to mechanical vibration.

2. In a machine roll according to claim 1, the further improvement
   A. in which each said journal has a first axially extending section telescopically seated within and mounting said roller sleeve,
   B. comprising means forming at least one circumferential groove recessing each journal axial section, and
   C. comprising bonding material in each said groove and bonded to said roller sleeve.

3. A roller sleeve for a machine roll, said sleeve having a cylindrical outer surface and a tubular inner surface, said sleeve comprising
   A. a first interior tubular layer of fiber-reinforced composite material and having inner and outer tubular surfaces, said first layer being characterized by light weight and high damping of mechanically induced vibration and being structured essentially of resin and of high damping polymer fibers, and
   B. a second layer disposed over the tubular outer surface of said first layer, said second layer having a selected relatively high hardness for resisting scratching and abrasion and forming said sleeve outer surface.

4. A roller sleeve according to claim 3 in which said second layer is of hardened reinforced composite material consisting essentially of polymer resin, reinforcing fibers and a scratch resistant constituent.

5. A roller sleeve according to claim 4 in which said scratch resistant constituent is a hard ceramic material.

6. A roller sleeve according to claim 1 in which said second layer is a fiber-reinforced composite material having a hard, crush-resistant particulate in the resin.

7. A roller sleeve according to claim 3 in which said second layer is of metal.

8. A roller sleeve according to claim 3 in which said second layer comprises a metal having a ceramic overcast.

9. A roller sleeve according to claim 3 further comprising a tubular interface layer of relatively high machinability bonded to a tubular surface of said first layer, said interface layer being a fiber reinforced resin composite.

10. A roller sleeve according to claim 3 in which said fibers of said interior layer are high damping polymer fibers selected from aramid fibers and from oriented polyethylene fibers.

11. A roller sleeve according to claim 3 in which said first interior layer is structured essentially of resin and of fiber and provides said layer with the following properties:

zero degree tensile modulus in excess of $1.5 \times 10^6$ psi;
maximum flexural strength in excess of 20,000 psi;
a density in grams per cubic centimeter between one and 2.5, and vibration damping at least five times greater than a like structure of carbon fiber and expoxy.

12. A roller sleeve according to claim 3 in which said first layer comprises plural plies of fiber and polymer resin.

13. A roller sleeve according to claim 12 in which said plural plies are of woven fibers.

14. A roller sleeve according to claim 3 further comprising a tubular interface layer secured with the tubular inner surface of said first layer and forming said sleeve tubular inner surface, said interface layer being a fiber reinforced resin composite.

15. A roller sleeve according to claim 3 further comprising a tubular interface layer disposed between said first layer and said second layer, said interface layer being a fiber reinforced resin composite structured for matching the thermal expansion and contraction properties of said first and second layers.

16. A method of fabricating a roller sleeve comprising the steps of forming a tubularly-shaped damped body layer of polymer reinforced with fibers, selecting said fibers to have mechanical damping in excess of that of carbon fibers and of fiberglass fibers applying a machinable and hard, wear-resistant outer roller layer over said body layer.

17. A method according to claim 16 comprising the further step of mounting said body layer on a pair of bearing journals, either before or after said applying of said outer layer.

18. A method according to claim 16 comprising the further step of forming at least one interface layer of fiber reinforced polymer on a tubular surface of said body layer.

19. A method according to claim 16 comprising the step of forming said body layer of multiple plies of continuous fiber and said polymer.

20. A method according to claim 3 further comprising the step of providing said sleeve with at least one further layer for balancing the roller sleeve about an imaginary cylindrical surface passing through the middle of the thickness of the sleeve.

* * * * *